(12) United States Patent
Kubota et al.

(10) Patent No.: US 8,879,172 B2
(45) Date of Patent: Nov. 4, 2014

(54) IMAGING LENS

(75) Inventors: Yoji Kubota, Nagano (JP); Kenichi Kubota, Nagano (JP); Hitoshi Hirano, Nagano (JP); Ichiro Kurihara, Tochigi (JP); Yoshio Ise, Tochigi (JP); Sumio Fukuda, Tochigi (JP)

(73) Assignees: Optical Logic Inc., Nagano (JP); Kantatsu Co., Ltd., Tochigi (JP)

( * ) Notice: Subject to any disclaimer, the term of this patent is extended or adjusted under 35 U.S.C. 154(b) by 97 days.

(21) Appl. No.: 13/347,048

(22) Filed: Jan. 10, 2012

(65) Prior Publication Data
US 2012/0194926 A1    Aug. 2, 2012

(30) Foreign Application Priority Data

Jan. 31, 2011    (JP) ................................. 2011-017732

(51) Int. Cl.
  *G02B 9/34* (2006.01)
  *G02B 13/18* (2006.01)
  *G02B 13/00* (2006.01)

(52) U.S. Cl.
  CPC .............. *G02B 13/004* (2013.01); *G02B 13/18* (2013.01); *G02B 9/34* (2013.01)
  USPC .......................................... 359/773; 359/715

(58) Field of Classification Search
  CPC ......... G02B 13/18; G02B 13/004; G02B 9/34
  USPC .................... 359/773, 715, 716, 766
  See application file for complete search history.

(56) References Cited

U.S. PATENT DOCUMENTS

| | | | | |
|---|---|---|---|---|
| 8,218,253 B2* | 7/2012 | Tang | ............................. | 359/773 |
| 8,264,784 B2* | 9/2012 | You | .............................. | 359/773 |
| 8,320,060 B2* | 11/2012 | Jo | .................. | 359/773 |
| 2008/0180816 A1* | 7/2008 | Nakamura | ..................... | 359/773 |
| 2012/0261550 A1* | 10/2012 | Chou et al. | ..................... | 359/715 |

FOREIGN PATENT DOCUMENTS

JP    2009-020182    1/2009

OTHER PUBLICATIONS

Klein, Miles V., and Thomas E. Furtak. Optics. New York: Wiley, 1986. pp. 135-139. Print.*
Notice of Reasons for Rejection for JP Patent Application 2011-017732, Apr. 22, 2014, Japan Patent Office.

* cited by examiner

*Primary Examiner* — Zachary Wilkes
(74) *Attorney, Agent, or Firm* — Kubotera & Associates, LLC

(57) ABSTRACT

An imaging lens includes a first lens L1 that has a biconvex shape near an optical axis and has positive refractive power, a second lens L2 that has a biconcave shape near the optical axis and has negative refractive power, a third lens L3 that has a shape of a meniscus lens directing a concave surface thereof to an object side near an optical axis and has positive refractive power, and a fourth lens L4 that has a biconcave shape near the optical axis and has negative refractive power, arranged in this order from the object side. When the whole lens system has a focal length f and the fourth lens L4 has a focal length f4, the imaging lens of the invention satisfies the following expression:

$-0.7 < f4/f < -0.1.$

13 Claims, 15 Drawing Sheets

IMAGING LENS

BACKGROUND OF THE INVENTION AND RELATED ART STATEMENT

The present invention relates to an imaging lens for forming an image on an imaging element such as a CCD sensor and a CMOS sensor. In particular, the present invention relates to an imaging lens suitable for mounting in a relatively small camera such as a cellular phone, a digital still camera, a portable information terminal, a security camera, an onboard camera, and a network camera.

In these years, most models of cellular phones include a camera as standard so as to increase their added values as cellular phones. Furthermore, such integration of digital still cameras in cellular phones has advanced in each year, so now that there is even available a cellular phone, which exhibits optical performances and has other functions that are well competitive to digital still cameras.

An imaging lens for mounting in a cellular phone is strongly required to have a small size for resolution of the imaging element, as well as sufficient optical performances. Conventionally, an imaging lens with a two- or three-lens imaging configuration has been used to ensure sufficient optical performances and a small size thereof in a balanced manner. In each year, however, required optical performances are higher and higher with advancement in attaining higher resolution. Therefore, such imaging lens with a two- or three-lens configuration is not good enough to correct aberrations and it is more difficult to ensure to meet required optical performances.

For this reason, there have been studies in adding another lens, i.e. an imaging lens with a four-lens configuration. For example, an imaging lens described in Patent Reference includes in this order from an object side, a first lens that has a biconvex shape and is positive; a second lens that has a shape of a negative meniscus lens directing a convex surface thereof to the object side; a third lens that has a shape of a positive meniscus lens directing a concave surface thereof to the object side; and a fourth lens that has a biconcave shape and is negative. According to this configuration, the ratio of a focal length of the fourth lens and a focal length of a whole lens system is set in preferred range. Keeping the ratio within the range, it is possible to ensure satisfactory optical performances while restraining increase in total length of the imaging lens.

Patent Reference: Japanese Patent Application Publication No. 2009-20182

According to the conventional imaging lens described in Patent Reference, it is possible to attain relatively satisfactory aberration. Cellular phones themselves, however, have become smaller and have higher functions every year, so that the size required for such imaging lens has been even smaller than before. In case of the lens configuration described in Patent Reference, it is difficult to attain both miniaturization and satisfactory aberration correction, which are required in an imaging lens.

Here, such issue is not specific to an imaging lens for mounting in the cellular phone to attain both miniaturization and satisfactory aberration correction, and it is a common task among imaging lenses for mounting in relatively small cameras such as digital still cameras, portable information terminals, security cameras, onboard cameras, and network cameras.

In view of the problems of the conventional techniques described above, an object of the present invention is to provide an imaging lens that can satisfactorily correct aberration while still attaining miniaturization.

SUMMARY OF THE INVENTION

In order to attain the object described above, according to the present invention, an imaging lens includes a first lens having positive refractive power; a second lens having negative refractive power; a third lens having positive refractive power; and a fourth lens having negative refractive power, arranged in this order from an object side to an image plane side. The first lens is formed in a shape so that a curvature radius on a surface thereof on the object side is positive. The second lens is formed in a shape so that a curvature radius of a surface thereof on the object side is negative and a curvature radius of a surface thereof on the image plane side is positive. The third lens is formed in a shape so that curvature radii of a surface thereof on the object side and a surface thereof on the image plane side are both negative. The fourth lens is formed in a shape so that a curvature radius of a surface thereof on the object side is negative and curvature radius of a surface thereof on the image plane side is positive.

When the whole lens system has a focal length f and the fourth lens has a focal length f4, the imaging lens having the above-described configuration satisfies the following conditional expression (1):

$$-0.7 < f4/f < -0.1 \tag{1}$$

When the imaging lens satisfies the conditional expression (1), it is possible to restrain aberrations within satisfactory ranges while attaining miniaturization of the imaging lens. When the value exceeds the upper limit "−0.1", the fourth lens has relatively stronger refractive power for the whole lens system. Accordingly, although it is advantageous for miniaturization of the imaging lens, it is difficult to correct off-axis aberrations. In addition, since error sensitivity in low image height region that is around the axis is high, precision has to be high upon fabrication of each lens that composes the imaging lens and upon assembling the imaging lens. For this reason, the manufacturing cost of the imaging lens has to increase. On the other hand, when the value is below the lower limit "−0.7", the fourth lens has relatively weaker refractive power for the whole lens system. Accordingly, while it is easy to restrain aberrations within satisfactory ranges, it is difficult to attain miniaturization of the imaging lens.

The imaging lens configured as described above preferably satisfies the following conditional expression (1A):

$$-0.57 < f4/f < -0.1 \tag{1A}$$

Moreover, in the fourth lens according to the configuration, when a curvature radius of a surface thereof on the object side is R7 and a curvature radius of a surface thereof on the image plane side is R8, the fourth lens preferably has a shape that satisfies the following conditional expression (2):

$$-1.5 < R8/R7 < -0.2 \tag{2}$$

When the imaging lens satisfies the conditional expression (2), it is possible to restrain aberrations within more satisfactory ranges, while attaining miniaturization of the imaging lens. When the value exceeds the upper limit "−0.2", the fourth lens has weaker refractive power. Accordingly, while it is easy to restraining aberrations within satisfactory ranges, it is difficult to attain miniaturization of the imaging lens. On the other hand, when the value is below the lower limit "−1.5", the fourth lens has stronger negative refractive power of a surface thereof on the object side, so that it is difficult to obtain axial optical performances and off-axis optical performances in a balanced manner.

When the whole lens system has a focal length f and the third lens has a focal length f3, the imaging lens having the above-described configuration preferably satisfies the following conditional expression (3):

$$0.15 < f3/f < 0.6 \quad (3)$$

When the imaging lens satisfies the conditional expression (3), it is possible to satisfactorily correct aberrations. When the value exceeds the upper limit "0.6", the third lens has relatively weaker refractive power for the whole lens system, so that it is difficult to satisfactorily correct off-axis aberration. On the other hand, when the value is below the lower limit "0.15", the third lens has relatively stronger refractive power for the whole lens system, so that it is difficult to restrain comma aberration and astigmatism within satisfactory ranges. In addition, since the error sensitivity is high, the productivity is lower, which results in increase of manufacturing cost of the imaging lens.

The imaging lens having the above-described configuration preferably satisfies the following conditional expression (3A):

$$0.20 < f3/f < 0.45 \quad (3A)$$

Furthermore, in the third lens according to the configuration, when a curvature radius of a surface thereof on the object side is R5 and a curvature radius of a surface thereof on the image plane side is R6, the third lens is preferably formed in a shape that satisfies the following conditional expression (4):

$$0.1 < R6/R5 < 1.0 \quad (4)$$

When the imaging lens satisfies the conditional expression (4), it is possible to ensure axial and off-axis optical performances in a balanced manner, while attaining miniaturization of the imaging lens. When the value exceeds the upper limit "1.0", the third lens has weaker refractive power. Accordingly, the axial optical performance and the off-axis optical performance are off the balance, so that it is difficult to obtain satisfactory imaging performance. On the other hand, when the value is below the lower limit "0.1", the third lens has stronger refractive power, so that it is difficult to attain miniaturization of the imaging lens.

When the whole lens system has the focal length f and a composite focal length of the third lens and the fourth lens is f34, the imaging lens having the above-described configuration preferably satisfies the following conditional expression (5):

$$-2.0 < f34/f < -0.5 \quad (5)$$

When the imaging lens satisfies the conditional expression (5), it is possible to shorten the total length of the imaging lens, i.e. attain lower profile, while keeping the focal length of the whole lens system constant. In addition, when the imaging lens satisfies the conditional expression (5), it is also possible to restrain incident angle of a light beam emitted from the imaging lens to an imaging element within a certain range, while restraining field curvature within a satisfactory range. As well known in the art, for light beams that an imaging element can take, a maximum incident angle is set as an incident angle limit in view of an imaging element structure. A light beam outside the range of the maximum incident angle may result in an image with a dark periphery due to a shading phenomenon. For this reason, it is necessary to restrain the incident angle of the light beam emitted from the imaging lens to the imaging element within the certain range.

In the conditional expression (5), when the value exceeds the upper limit "−0.5", composite refractive power of the third lens and the fourth lens is strong, so that a position of a principal point of the whole lens system moves towards an object side. For this reason, while it is effective to lower the profile of the imaging lens, it is difficult to restrain the incident angle of a principal beam within the certain range. In addition, the best image surface at the periphery is warped towards the image plane side in relative to the center part of the image formation, so that it is difficult to obtain satisfactory imaging performance.

Here, when the composite refractive power of the third lens and the fourth lens is strong like this, in order to satisfactorily correct aberrations, it is necessary to also increase the composite refractive power of the first lens and the second lens. In this case, however, since each lens has strong refractive power, it is difficult to satisfactorily correct aberrations. On the other hand, when the value is below the lower limit "−2.2", the composite refractive power of the third lens and the fourth lens is weak. Accordingly, while it is easy to restrain the incident angle of a light beam emitted from the imaging lens to the imaging element within the certain range, it is difficult to ensure back focus. Furthermore, an off-axis chromatic aberration of magnification is insufficiently corrected, so that it is difficult to obtain satisfactory imaging performance in this case, too.

When the whole lens system has the focal length f and the second lens has a focal length f2, the imaging lens having the above-described imaging lens preferably satisfies the following conditional expression (6):

$$-0.9 < f2/f < -0.1 \quad (6)$$

When the imaging lens satisfies the conditional expression (6), it is possible to more satisfactorily satisfy the aberrations. When the value exceeds the upper limit "−0.1", the second lens has relatively stronger refractive power for the whole lens system, so that it is difficult to correct a spherical aberration and a coma aberration. On the other hand, when the value is below the lower limit "−0.9", the second lens has relatively weaker refractive power for the whole lens system, so that it is difficult to correct an axial chromatic aberration. Therefore, in either case, it is difficult to obtain satisfactory imaging performance.

In the second lens according to the imaging lens having the above-described configuration, when a curvature radius of a surface thereof on the object side is R3 and a curvature radius of a surface thereof on the image plane side is R4, the second lens is preferably formed in a shape that satisfies the following conditional expression (7):

$$-8.0 < R4/R3 < -2.0 \quad (7)$$

When the imaging lens satisfies the conditional expression (7), it is possible to restrain the error sensitivity, which is a measure of productivity upon producing an imaging lens, within preferred range. When the value is below the lower limit "−8.0", the second lens has stronger negative refractive power and the error sensitivity is high, so that productivity of the imaging lens is low. On the other hand, when the value exceeds the upper limit "−2.0", the second lens has weaker refractive power and it is difficult to attain miniaturization of the imaging lens.

When the whole lens system has the focal length f and the first lens has a focal length f1, the imaging lens having the above-described configuration preferably satisfies the following conditional expression (8).

$$0.2 < f1/f < 0.6 \quad (8)$$

When the imaging lens satisfies the conditional expression (8), it is possible to restrain aberrations within more satisfactory ranges, while attaining miniaturization of the imaging lens. When the value exceeds the upper limit "0.6", the first lens has relatively weaker refractive power for the whole lens system, so that it is difficult to attain miniaturization of the imaging lens. On the other hand, when the value is below the lower limit "0.2", the first lens has relatively stronger refractive power for the whole lens system. Accordingly, while it is advantageous for miniaturization of the imaging lens, it is difficult to restrain a spherical aberration and a coma aberration within satisfactory ranges.

According to the imaging lens having the above-described configuration, the first lens is preferably formed in a shape so that a curvature radius of a surface thereof on the object side is positive, a curvature radius of a surface thereof on the image plane side is negative, and satisfies the following conditional expression (9) when a curvature radius of a surface thereof on the object side is R1 and a curvature radius of a surface thereof on the image plane side is R2:

$$-2.0 < R1/R2 < -1.0 \tag{9}$$

When the imaging lens satisfies the conditional expression (9), it is possible to more satisfactorily correct aberrations. When the value exceeds the upper limit "−1.0", the first lens has stronger positive refractive power of a surface thereof on the object side and the error sensitivity is high, so that the productivity of the imaging lens is low. On the other hand, when the value is below the lower limit "−2.0", the first lens has stronger positive refractive power of a surface thereof on the image plane side and is subjected to increase in generation of a spherical aberration on the surface, so that it is difficult to sufficiently ensure the axial optical performance.

According to the imaging lens of the invention, it is possible to provide an imaging lens that can attain both miniaturization of the imaging lens and satisfactory aberration correction.

DETAILED DESCRIPTION OF PREFERRED EMBODIMENTS

Hereunder, referring to the accompanying drawings, an embodiment of the present invention will be fully described.

FIGS. 1, 4, 7, 10, and 13 are sectional views of image lenses in Numerical Data Examples 1 to 5 according to the embodiment, respectively. Since a basic lens configuration is the same among the Numerical Data Examples 1 to 5, the lens configuration of the embodiment will be described with reference to the lens sectional view of Numerical Data Example 1.

Figure 1:
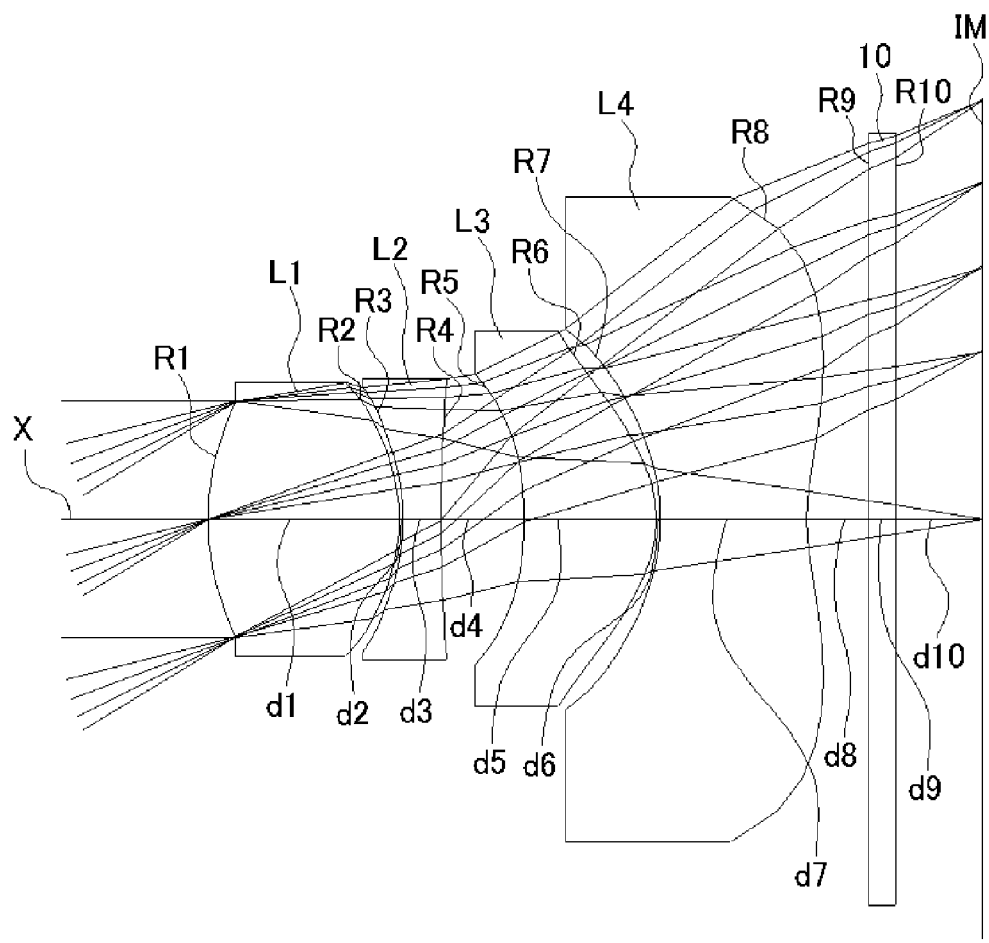
FIG. 1 is a schematic sectional view showing a configuration of an imaging lens in Numerical Data Example 1 according to an embodiment of the invention.

As shown in FIG. 1, the imaging lens of the embodiment has a first lens L1 having positive refractive power, a second lens L2 having negative refractive power, a third lens L3 having positive refractive power, and a fourth lens L4 having negative refractive power, arranged in this order from an object side to an image plane side. A filter 10 is provided between the fourth lens L4 and the image plane IM. Here, the filter 10 may be optionally omitted. In the imaging lens according to this embodiment, there is provided an aperture stop on an object-side surface of the first lens L1.

According to the imaging lens having the above-described configuration, the first lens L1 is formed in a shape so that a curvature R1 of a surface thereof on the object side is positive and a curvature radius R2 of a surface thereof on the image plane side is negative, i.e. a shape of a biconvex lens near an optical axis X. Here, the shape of the first lens L1 is not limited to the one in this embodiment. The first lens L1 can have any shape as long as the curvature radius R1 of a surface thereof on the object side surface is positive. For example, the first lens L1 may be formed in a shape so that the curvature radii R1 and R2 are both positive, i.e. a shape of a meniscus lens directing a convex surface to the object side near the optical axis X.

The second lens L2 is formed in a shape so that a curvature radius R3 of a surface thereof on the object side is negative and a curvature radius R4 of a surface thereof on the image plane side is positive, i.e. a shape of a biconcave lens near the optical axis X.

The third lens L3 is formed in a shape so that a curvature radius R5 of a surface thereof on the object side and a curvature radius R6 of a surface thereof on the image plane side are both negative, and has a shape of a meniscus lens directing a concave surface to the object side near the optical axis X. The fourth lens L4 is formed in a shape so that a curvature radius R7 of a surface thereof on the object side is negative and a curvature radius R8 of a surface thereof on the image plane side is positive, and has a shape of a biconcave lens near the optical axis X.

The imaging lens of this embodiment satisfies the following conditional expressions (1) to (9). Therefore, according to the imaging lens of this embodiment, it is possible to attain both miniaturization of the imaging lens and satisfactory aberration correction.

$-0.7 < f4/f < -0.1$ (1)

$-1.5 < R8/R7 < -0.2$ (2)

$0.15 < f3/f < 0.6$ (3)

$0.1 < R6/R5 < 1.0$ (4)

$-2.0 < f34/f < -0.5$ (5)

$-0.9 < f2/f < -0.1$ (6)

$-8.0 < R4/R3 < -2.0$ (7)

$0.2 < f1/f < 0.6$ (8)

$-2.0 < R1/R2 < -1.0$ (9)

In the above conditional expressions,
 f: Focal length of the whole lens system
 f1: Focal length of the first lens L1
 f2: Focal length of the second lens L2
 f3: Focal length of the third lens L3
 f4: Focal length of the fourth lens L4
 f34: Composite focal length of the third lens L3 and the fourth lens L4

In order to attain miniaturization of the imaging lens while further satisfactorily correcting aberrations, the imaging lens of this embodiment satisfies the following conditional expressions (1A) and (3A):

$-0.57 < f4/f < -0.1$ (1A)

$0.20 < f3/f < 0.45$ (3A)

Here, it is not necessary to satisfy all of the conditional expressions (1) to (9) (including the conditional expressions (1A) and (3A), hereinafter which will be the same). When any single one of the conditional expressions is individually satisfied, it is possible to obtain an effect corresponding to the respective conditional expression.

In the embodiment, each lens has a lens surface that is formed to be an aspheric surface as necessary. When the aspheric surfaces applied to the lens surfaces have an axis Z in the optical axis direction, a height H in a direction perpendicular to the optical axis, a conical coefficient k, and aspheric coefficients $A_4$, $A_6$, $A_8$, $A_{10}$, $A_{12}$, $A_{14}$ and $A_{16}$, a shape of the aspheric surfaces of the lens surfaces may be expressed as follows:

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$ 
[Formula 1]

Next, Numerical Data Examples of the embodiment will be described. In each of the Numerical Data Examples, f represents a focal length of a whole lens system, Fno represents an F number, and ω represents a half angle of view, respectively. In addition, i represents a surface number counted from the object side, R represents a curvature radius, d represents a distance between lens surfaces (surface spacing) on the optical axis, Nd represents a refractive index for a d line, and vd represents Abbe's number for the d line, respectively. Here, aspheric surfaces are indicated with surface numbers i affixed with * (asterisk).

Numerical Data Example 1

Basic lens data are shown below.
f = 4.99 mm, Fno = 2.89, ω = 31.6°
Unit: mm

Surface Data

| Surface Number i | R | d | Nd | vd |
|---|---|---|---|---|
| (Object) | ∞ | ∞ | | |
| 1* (Stop) | 1.85 | 1.40 | 1.53 | 56.0 |
| 2* | −1.34 | 0.03 | | |
| 3* | −1.64 | 0.28 | 1.61 | 26.0 |
| 4* | 9.68 | 0.61 | | |
| 5* | −2.18 | 0.96 | 1.61 | 26.0 |
| 6* | −0.92 | 0.03 | | |
| 7* | −1.60 | 1.07 | 1.53 | 56.0 |
| 8* | 1.82 | 0.45 | | |
| 9 | ∞ | 0.20 | 1.52 | 64.1 |
| 10 | ∞ | 0.63 | | |
| (Image Plane) | ∞ | | | | f1 = 1.74 mm
f2 = −2.26 mm
f3 = 2.00 mm
f4 = −1.46 mm
f34 = −5.36 mm

Aspheric Surface Data

First Surface
k = 0.000, $A_4$ = −7.098E−04, $A_6$ = −4.937E−02, $A_8$ = 5.124E−02,
$A_{10}$ = −2.591E−03, $A_{12}$ = −5.015E−02
Second Surface k = −1.215, $A_4$ = 6.859E−02, $A_6$ = −1.098E−01, $A_8$ = 1.478E−02
Third Surface k = −6.125E−01, $A_4$ = 4.040E−02, $A_6$ = −2.046E−02, $A_8$ = −1.218E−02,
$A_{10}$ = −2.826E−02, $A_{12}$ = −3.797E−02, $A_{14}$ = 8.913E−02,
$A_{16}$ = −2.745E−02
Fourth Surface k = 0.000, $A_4$ = −3.481E−02, $A_6$ = 4.792E−02, $A_8$ = 2.587E−02,
$A_{10}$ = −1.054E−01, $A_{12}$ = 5.305E−02, $A_{14}$ = 1.270E−02,
$A_{16}$ = −1.181E−02
Fifth Surface k = −3.864, $A_4$ = −7.388E−02, $A_6$ = −1.060E−01, $A_8$ = 1.943E−01,
$A_{10}$ = −1.192E−01, $A_{12}$ = −7.838E−02, $A_{14}$ = 1.509E−01,
$A_{16}$ = −6.931E−02
Sixth Surface k = −8.939E−01, $A_4$ = 1.683E−01, $A_6$ = −1.209E−01, $A_8$ = 8.367E−02,
$A_{10}$ = −2.102E−02, $A_{12}$ = −2.340E−03, $A_{14}$ = 2.071E−03,
$A_{16}$ = −1.801E−04
Seventh Surface k = 0.000, $A_4$ = −2.867E−02, $A_6$ = 1.016E−01, $A_8$ = −5.918E−02,
$A_{10}$ = 1.632E−02, $A_{12}$ = −1.550E−03, $A_{14}$ = 3.505E−05,
$A_{16}$ = −2.095E−04
Eighth Surface k = −1.536E+01, $A_4$ = −7.804E−02, $A_6$ = 3.708E−02, $A_8$ = −1.409E−02,
$A_{10}$ = 3.460E−03, $A_{12}$ = −5.711E−04, $A_{14}$ = 5.733E−05,
$A_{16}$ = −2.714E−06

Values of the respective conditional expressions are shown below:

$f4/f=-0.29$ $R8/R7=-1.14$ $f3/f=0.40$ $R6/R5=0.42$ $f34/f=-1.07$ $f2/f=-0.45$ $R4/R3=-5.90$ $f1/f=0.35$ $R1/R2=-1.38$

Accordingly, the imaging lens of this Numerical Data Example 1 satisfies the respective conditional expressions (1) to (9). In addition, a distance on the optical axis X from the surface of the first lens L1 on the object side to the image plane IM is 5.59 mm in air, and therefore the size of the imaging lens is suitably reduced.

Figure 2:
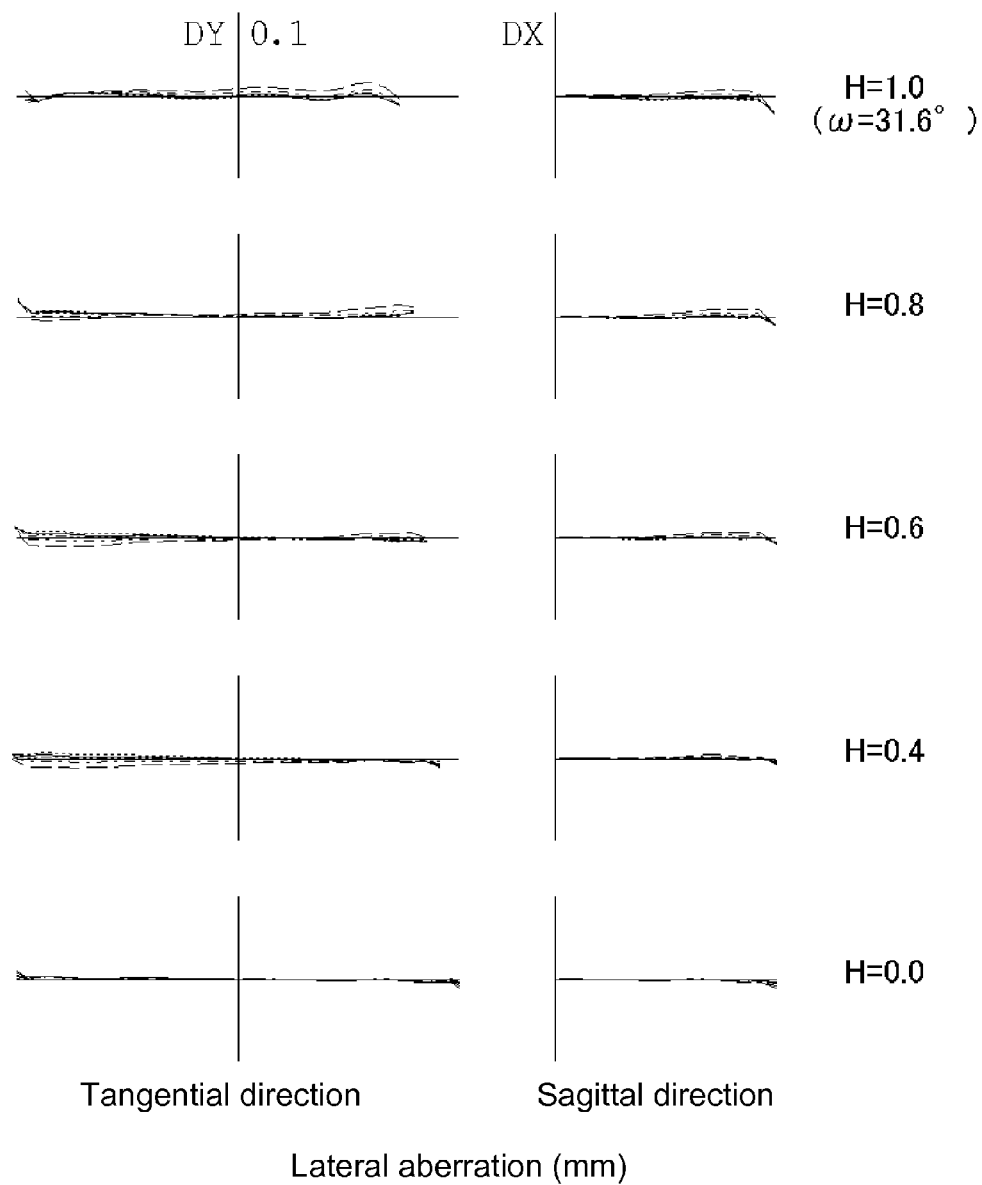
FIG. 2 is an aberration diagram showing a lateral aberration of the imaging lens of FIG. 1.
Figure 3:
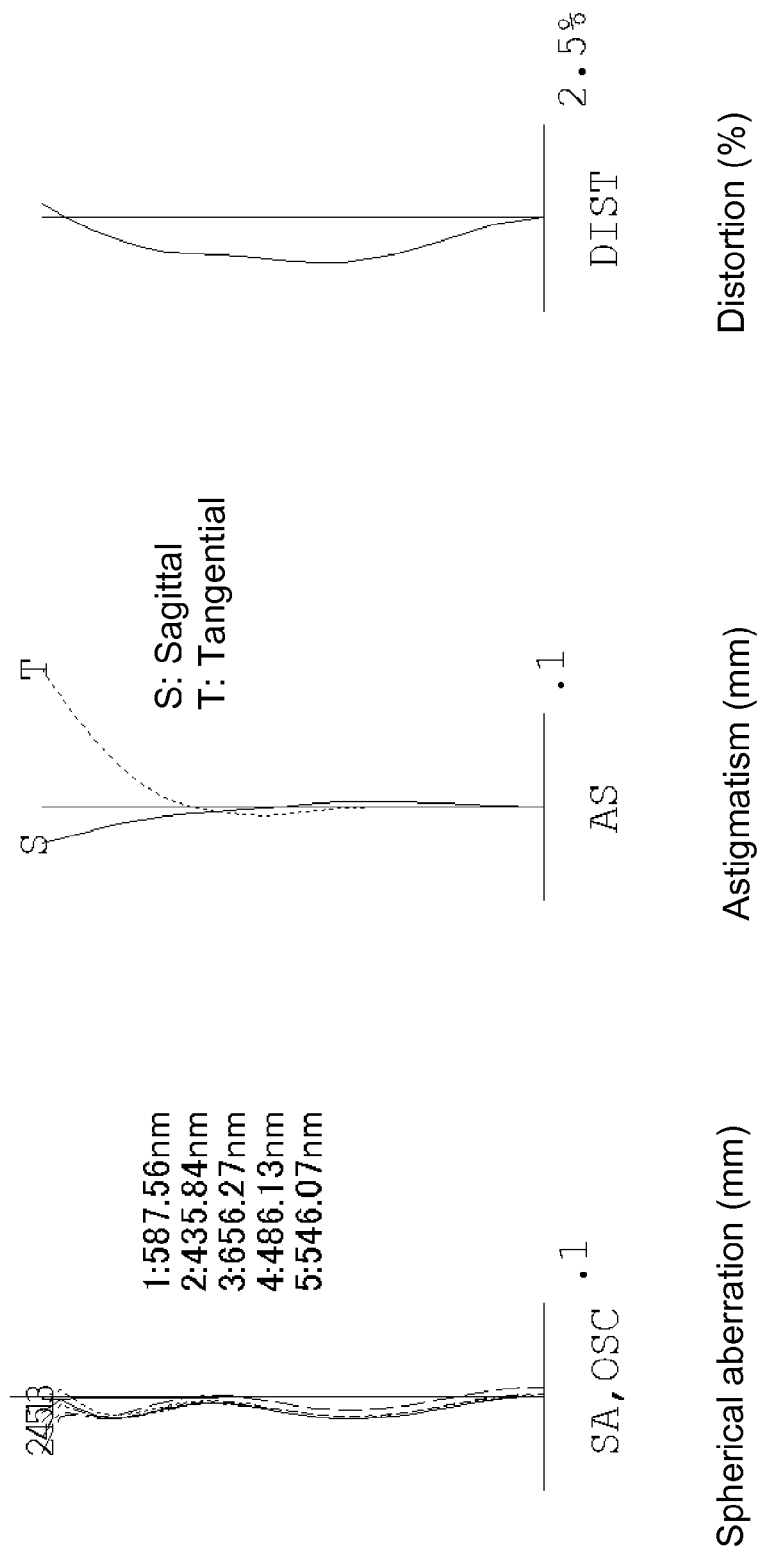
FIG. 3 is an aberration diagram showing a spherical aberration, an astigmatism, and a distortion of the imaging lens of FIG. 1.
Figure 4:
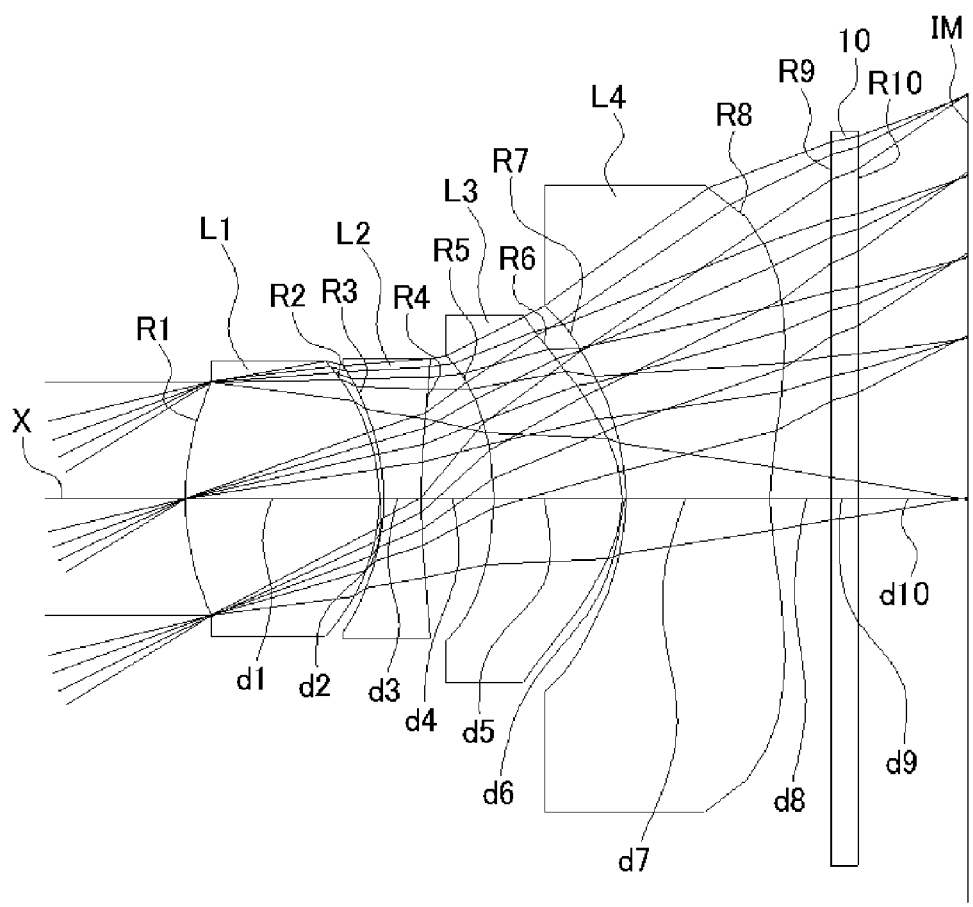
FIG. 4 is a schematic sectional view showing a configuration of an imaging lens in Numerical Data Example 2 according to the embodiment.

FIG. 2 shows a lateral aberration that corresponds to a ratio H of each image height to the maximum image height (hereinafter referred to as "image height ratio H") in the imaging lens of Numerical Data Example 1 by dividing into a tangential direction and a sagittal direction (which is also the same in FIGS. 5, 8, 11, and 14). Furthermore, FIG. 3 shows a spherical aberration SA (mm), an astigmatism AS (mm), and a distortion DIST (%) of the imaging lens of Numerical Data Example 1, respectively. In the aberration diagrams, the Offence against the Sine Condition (OSC) is also indicated for the spherical aberration diagram in addition to the aberrations at the respective wavelengths of 587.56 nm, 435.84 nm, 656.27 nm, 486.13 nm, and 546.07 nm. Further, in the astigmatism diagram, the aberration on the sagittal image surface S and the aberration on the tangential image surface T are respectively indicated (which are the same in FIGS. 6, 9, 12, and 15). As shown in FIGS. 2 and 3, in the imaging lens of Numerical Data Example 1, the image plane is satisfactorily corrected and each aberration is suitably corrected.

Numerical Data Example 2

Basic lens data are shown below.
f = 4.94 mm, Fno = 2.88, ω = 31.0°
Unit: mm

Surface Data

| Surface Number i | R | d | Nd | vd |
|---|---|---|---|---|
| (Object) | ∞ | ∞ | | |
| 1* (Stop) | 1.92 | 1.42 | 1.53 | 56.0 |
| 2* | −1.34 | 0.03 | | |
| 3* | −1.66 | 0.28 | 1.61 | 26.0 |
| 4* | 6.29 | 0.53 | | |
| 5* | −2.28 | 0.94 | 1.58 | 30.0 |
| 6* | −0.91 | 0.03 | | |
| 7* | −1.84 | 1.06 | 1.53 | 56.0 |
| 8* | 2.02 | 0.45 | | |
| 9 | ∞ | 0.20 | 1.52 | 64.1 |
| 10 (Image Plane) | ∞ ∞ | 0.80 | | | f1 = 1.74 mm
f2 = −2.12 mm
f3 = 2.06 mm
f4 = −1.64 mm
f34 = −8.41 mm

Aspheric Surface Data

First Surface k = 0.000, $A_4$ = 1.977E−03, $A_6$ = −5.030E−02, $A_8$ = 4.818E−02, $A_{10}$ = −3.016E−03, $A_{12}$ = −4.450E−02
Second Surface k = −1.233, $A_4$ = 6.937E−02, $A_6$ = −1.080E−01, $A_8$ = 1.811E−02
Third Surface k = −6.218E−01, $A_4$ = 4.201E−02, $A_6$ = −2.405E−02, $A_8$ = −1.099E−02, $A_{10}$ = −2.538E−02, $A_{12}$ = −3.558E−02, $A_{14}$ = 8.838E−02, $A_{16}$ = −2.698E−02
Fourth Surface k = 0.000, $A_4$ = −3.180E−02, $A_6$ = 5.124E−02, $A_8$ = 2.421E−02, $A_{10}$ = −1.083E−01, $A_{12}$ = 5.032E−02, $A_{14}$ = 1.097E−02, $A_{16}$ = −8.894E−03
Fifth Surface k = −4.311, $A_4$ = −7.071E−02, $A_6$ = −1.062E−01, $A_8$ = 1.908E−01, $A_{10}$ = −1.123E−01, $A_{12}$ = −8.074E−02, $A_{14}$ = 1.455E−01, $A_{16}$ = −7.148E−02
Sixth Surface k = −8.999E−01, $A_4$ = 1.670E−01, $A_6$ = −1.205E−01, $A_8$ = 8.214E−02, $A_{10}$ = −2.189E−02, $A_{12}$ = −2.243E−03, $A_{14}$ = 2.279E−03, $A_{16}$ = −1.009E−04
Seventh Surface k = 0.000, $A_4$ = −2.683E−02, $A_6$ = 9.070E−02, $A_8$ = −5.937E−02, $A_{10}$ = 1.702E−02, $A_{12}$ = −1.918E−03, $A_{14}$ = 3.080E−04, $A_{16}$ = −2.185E−04
Eighth Surface k = −1.781E+01, $A_4$ = −7.506E−02, $A_6$ = 3.660E−02, $A_8$ = −1.418E−02, $A_{10}$ = 3.480E−03, $A_{12}$ = −5.684E−04, $A_{14}$ = 5.733E−05, $A_{16}$ = −2.846E−06

Values of the respective conditional expressions are shown below:

$f4/f=-0.33$ $R8/R7=-1.10$ $f3/f=0.42$ $R6/R5=0.40$ $f34/f=-1.70$ $f2/f=-0.43$ $R4/R3=-3.79$ $f1/f=0.35$ $R1/R2=-1.43$

Accordingly, the imaging lens of Numerical Data Example 2 satisfies the respective conditional expressions (1) to (9). In addition, a distance on the optical axis X from the surface of the first lens L1 on the object side to the image plane IM is 5.67 mm in air, and therefore the size of the imaging lens is suitably reduced.

Figure 5:
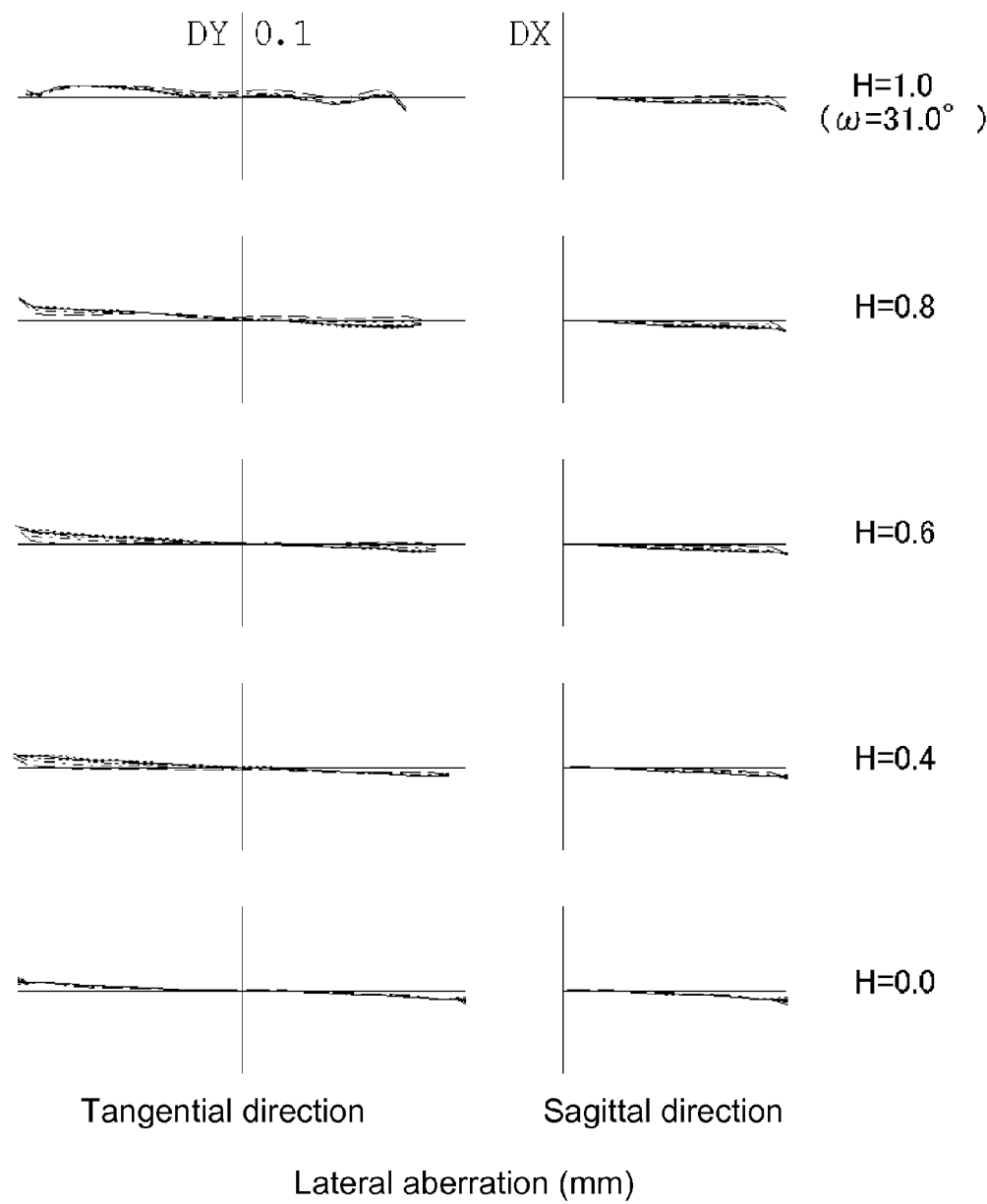
FIG. 5 is an aberration diagram showing a lateral aberration of the imaging lens of FIG. 4.
Figure 6:
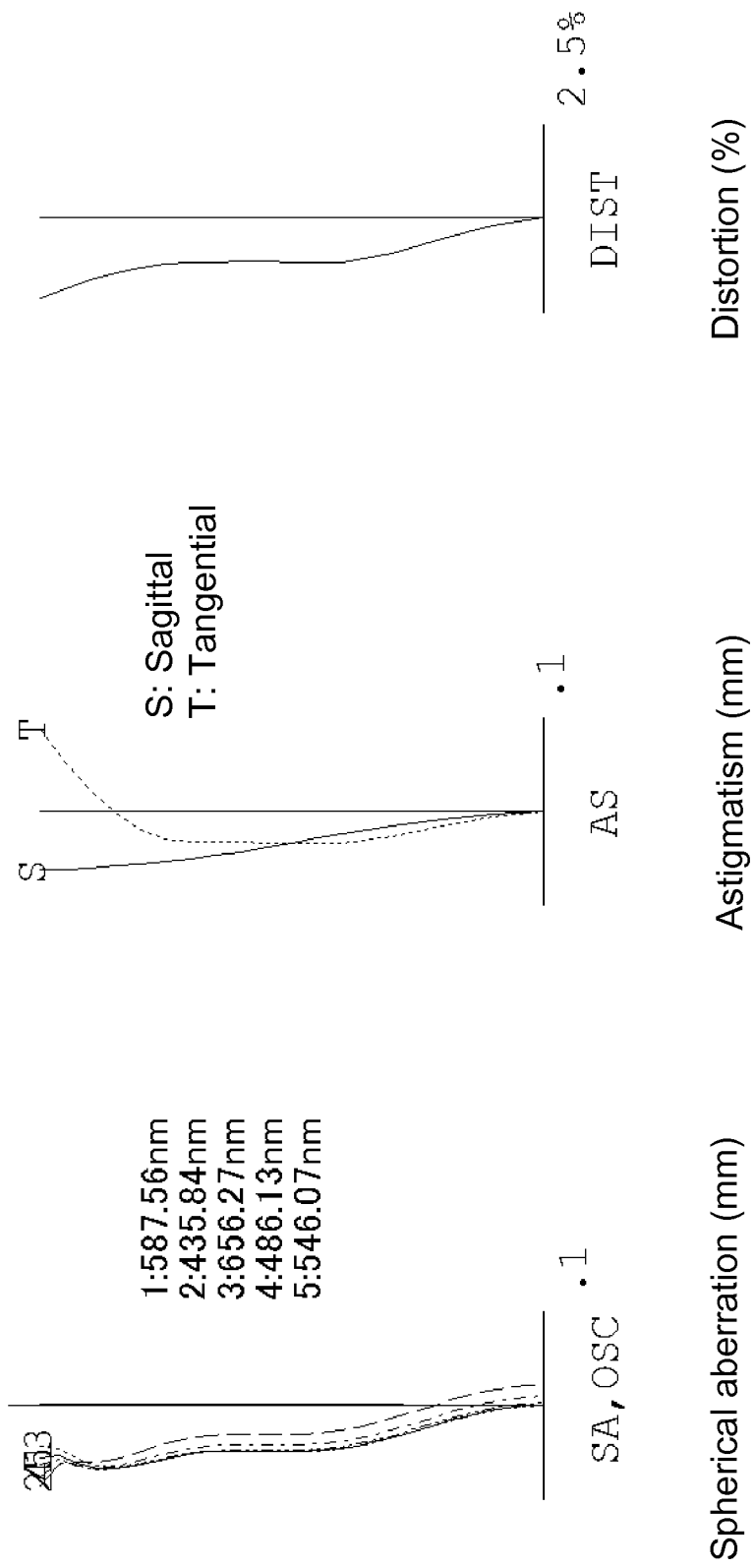
FIG. 6 is an aberration diagram showing a spherical aberration, an astigmatism, and a distortion of the imaging lens of FIG. 4.
Figure 7:
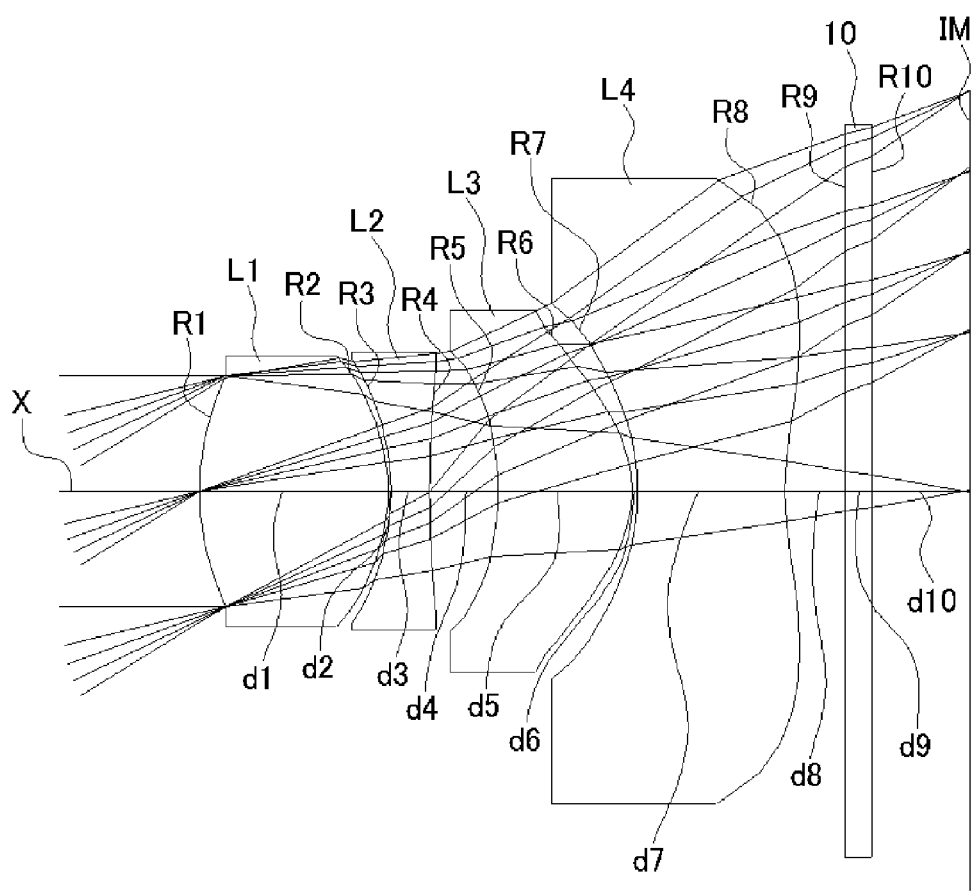
FIG. 7 is a schematic sectional view showing a configuration of an imaging lens in Numerical Data Example 3 according to the embodiment.

FIG. 5 shows a lateral aberration that corresponds to the image height ratio H, and FIG. 6 shows a spherical aberration SA (mm), an astigmatism AS (mm), and a distortion DIST (%) of the imaging lens of Numerical Data Example 2, respectively. As shown in FIGS. 5 and 6, in the imaging lens of Numerical Data Example 2, the image plane is satisfactorily corrected and each aberration is also suitably corrected, similarly to Numerical Data Example 1.

Numerical Data Example 3

Basic lens data are shown below.
f = 4.93 mm, Fno = 2.88, ω = 31.1°
Unit: mm

Surface Data

| Surface Number i | R | d | Nd | vd |
|---|---|---|---|---|
| (Object) | ∞ | ∞ | | |
| 1* (Stop) | 1.91 | 1.40 | 1.53 | 56.0 |
| 2* | −1.36 | 0.02 | | |
| 3* | −1.68 | 0.28 | 1.61 | 26.0 |
| 4* | 7.45 | 0.51 | | |
| 5* | −2.29 | 1.00 | 1.54 | 55.9 |
| 6* | −0.89 | 0.04 | | |
| 7* | −1.79 | 1.09 | 1.53 | 56.0 |
| 8* | 2.04 | 0.45 | | |
| 9 | ∞ | 0.20 | 1.52 | 64.1 |
| 10 (Image Plane) | ∞ | 0.73 | | | f1 = 1.74 mm
f2 = −2.21 mm
f3 = 2.14 mm
f4 = −1.62 mm
f34 = −6.86 mm

Aspheric Surface Data

First Surface $k = 0.000, A_4 = 2.761E-03, A_6 = -5.008E-02, A_8 = 4.793E-02,$
$A_{10} = -3.004E-03, A_{12} = -4.352E-02$ Second Surface $k = -1.252, A_4 = 6.941E-02, A_6 = -1.083E-01, A_8 = 1.730E-02$ Third Surface $k = -6.631E-01, A_4 = 4.267E-02, A_6 = -2.434E-02, A_8 = -1.078E-02,$
$A_{10} = -2.571E-02, A_{12} = -3.542E-02, A_{14} = 8.803E-02,$
$A_{16} = -2.734E-02$ Fourth Surface $k = 0.000, A_4 = -3.411E-02, A_6 = 4.921E-02, A_8 = 2.400E-02,$
$A_{10} = -1.074E-01, A_{12} = 4.993E-02, A_{14} = 1.055E-02,$
$A_{16} = -9.958E-03$ Fifth Surface $k = -3.984, A_4 = -7.363E-02, A_6 = -1.092E-01, A_8 = 1.914E-01,$
$A_{10} = -1.124E-01, A_{12} = -8.203E-02, A_{14} = 1.445E-01,$
$A_{16} = -7.298E-02$ Sixth Surface $k = -9.023E-01, A_4 = 1.678E-01, A_6 = -1.205E-01, A_8 = 8.189E-02,$
$A_{10} = -2.197E-02, A_{12} = -2.202E-03, A_{14} = 2.349E-03,$
$A_{16} = -4.068E-05$ Seventh Surface $k = 0.000, A_4 = -3.266E-02, A_6 = 8.901E-02, A_8 = -5.940E-02,$ Basic lens data are shown below.
f = 4.93 mm, Fno = 2.88, ω = 31.1°
Unit: mm $A_{10} = 1.711E-02, A_{12} = -1.945E-03, A_{14} = 2.908E-04,$
$A_{16} = -2.683E-04$ Eighth Surface $k = -1.645E+01, A_4 = -7.524E-02, A_6 = 3.665E-02, A_8 = -1.419E-02,$
$A_{10} = 3.476E-03, A_{12} = -5.688E-04, A_{14} = 5.738E-05,$
$A_{16} = -2.807E-06$ Values of the respective conditional expressions are shown below:

$f4/f = -0.33$ $R8/R7 = -1.14$ $f3/f = 0.43$ $R6/R5 = 0.39$ $f34/f = -1.39$ $f2/f = -0.45$ $R4/R3 = -4.43$ $f1/f = 0.35$ $R1/R2 = -1.40$

Accordingly, the imaging lens of Numerical Data Example 3 satisfies the respective conditional expressions (1) to (9). In addition, a distance on the optical axis X from the surface of the first lens L1 on the object side to the image plane IM is 5.65 mm in air, and therefore the size of the imaging lens is suitably reduced.

Figure 8:
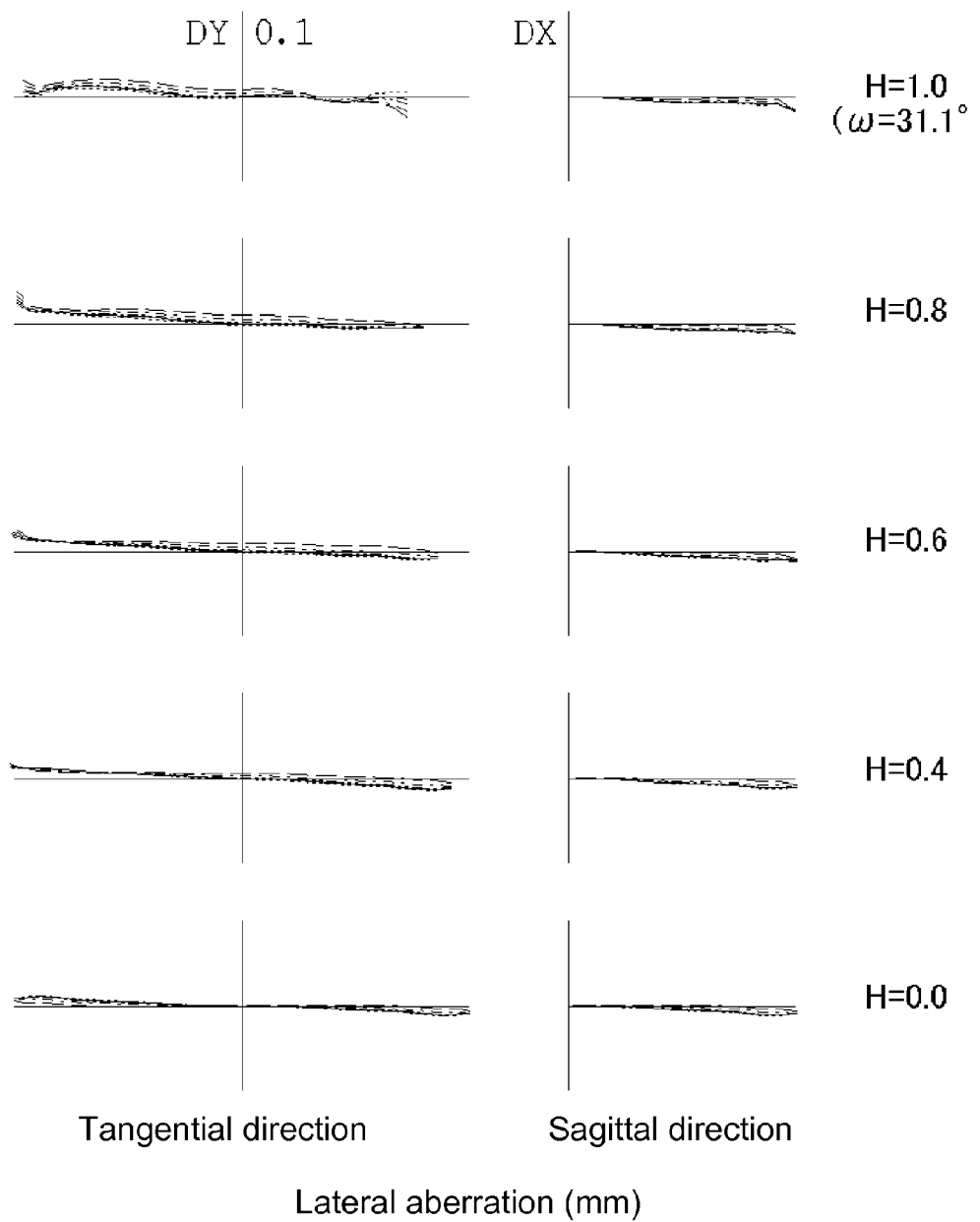
FIG. 8 is an aberration diagram showing a lateral aberration of the imaging lens of FIG. 7.
Figure 9:
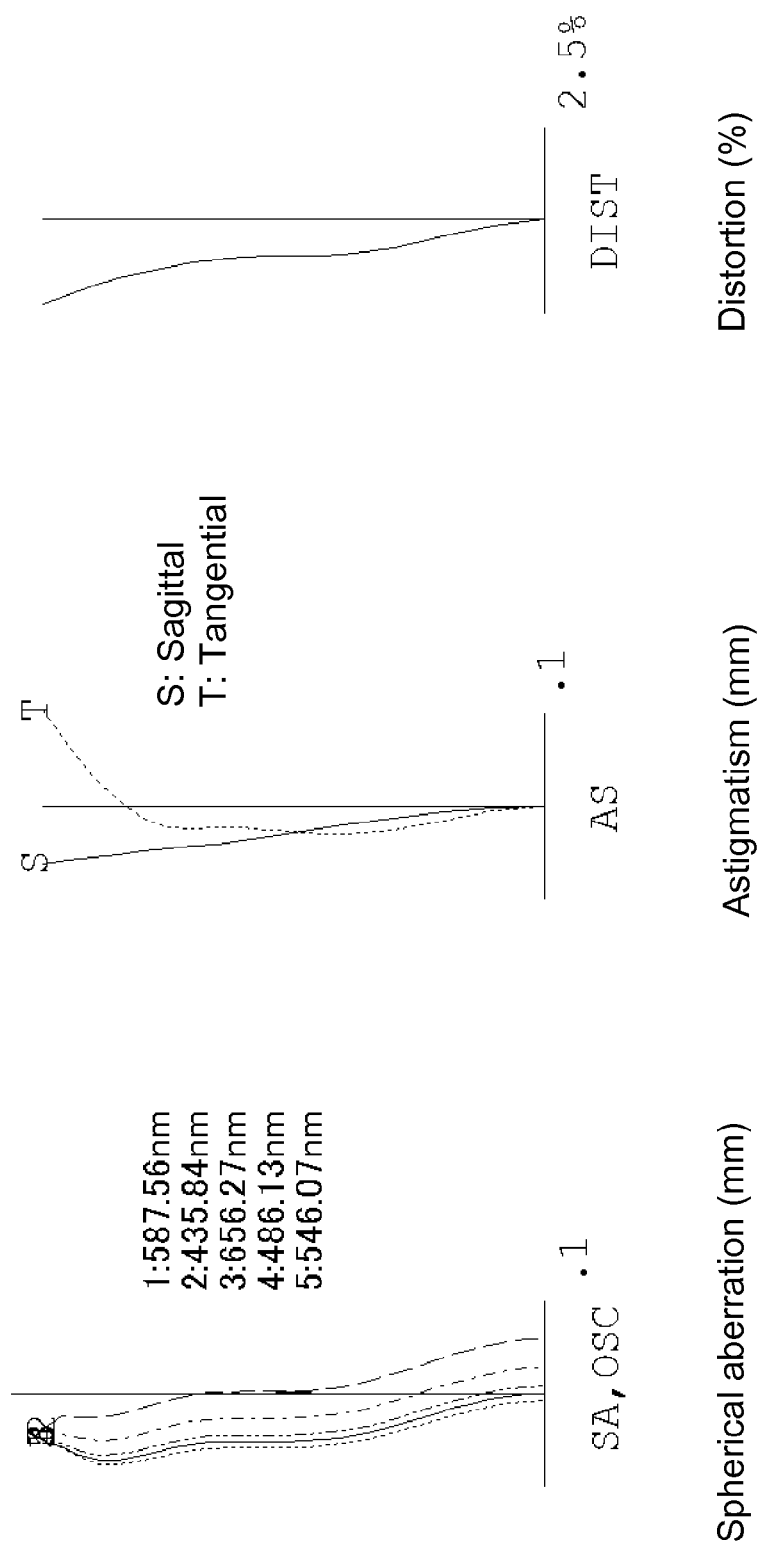
FIG. 9 is an aberration diagram showing a spherical aberration, an astigmatism, and a distortion of the imaging lens of FIG. 7.
Figure 10:
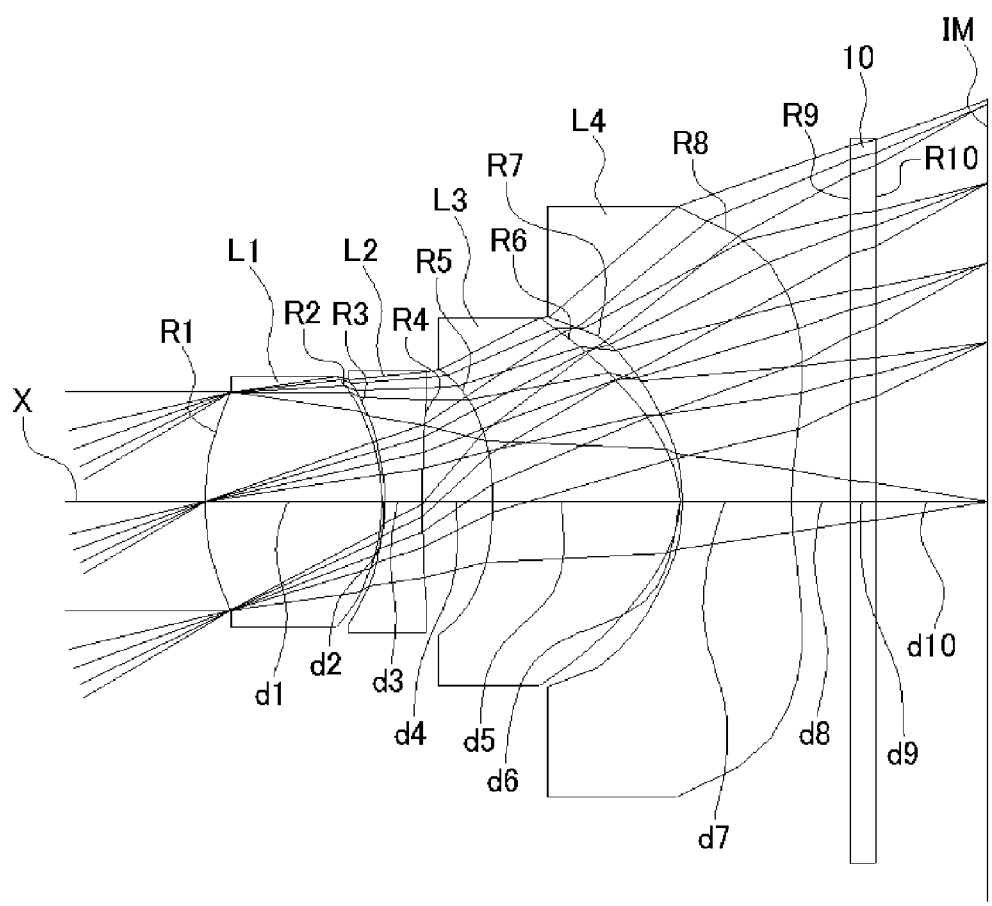
FIG. 10 is a schematic sectional view showing a configuration of an imaging lens in Numerical Data Example 4 according to the embodiment.

FIG. 8 shows a lateral aberration that corresponds to the image height ratio H, and FIG. 9 shows a spherical aberration SA (mm), an astigmatism AS (mm), and a distortion DIST (%) of the imaging lens of Numerical Data Example 3, respectively. As shown in FIGS. 8 and 9, in the imaging lens of Numerical Data Example 3, the image plane is satisfactorily corrected and each aberration is also suitably corrected, similarly to Numerical Data Example 1.

Numerical Data Example 4

Basic lens data are shown below.
f = 5.11 mm, Fno = 3.02, ω = 31.0°
Unit: mm

Surface Data

| Surface Number i | R | d | Nd | vd |
|---|---|---|---|---|
| (Object) | ∞ | ∞ | | |
| 1* (Stop) | 1.87 | 1.37 | 1.53 | 56.0 |
| 2* | −1.43 | 0.02 | | |
| 3* | −1.68 | 0.29 | 1.61 | 26.0 |
| 4* | 8.64 | 0.54 | | |
| 5* | −2.23 | 1.44 | 1.54 | 55.9 |
| 6* | −0.76 | 0.02 | | |
| 7* | −1.45 | 0.84 | 1.53 | 56.0 |
| 8* | 2.03 | 0.45 | | |
| 9 | ∞ | 0.20 | 1.52 | 64.1 |
| 10 | ∞ | 0.86 | | |

-continued

Basic lens data are shown below.
f = 5.11 mm, Fno = 3.02, ω = 31.0°
Unit: mm

| (Image Plane) | ∞ |
|---|---| f1 = 1.77 mm
f2 = −2.26 mm
f3 = 1.58 mm
f4 = −1.46 mm
f34 = −9.41 mm

Aspheric Surface Data

First Surface $k = 0.000, A_4 = 3.287E-03, A_6 = -4.587E-02, A_8 = 5.105E-02,$
$A_{10} = -1.858E-03, A_{12} = -4.443E-02$
Second Surface $k = -1.205, A_4 = 6.712E-02, A_6 = -1.130E-01, A_8 = 1.398E-02$
Third Surface $k = -6.442E-01, A_4 = 4.117E-02, A_6 = -2.693E-02, A_8 = -1.431E-02,$
$A_{10} = -3.194E-02, A_{12} = -3.939E-02, A_{14} = 8.590E-02,$
$A_{16} = -2.360E-02$
Fourth Surface $k = 0.000, A_4 = -3.575E-02, A_6 = 4.929E-02, A_8 = 2.590E-02,$
$A_{10} = -1.057E-01, A_{12} = 5.042E-02, A_{14} = 9.552E-03,$
$A_{16} = -1.319E-02$
Fifth Surface $k = -6.963E-01, A_4 = -1.008E-01, A_6 = -9.911E-02, A_8 = 1.917E-01, A_{10} = -1.178E-01, A_{12} = -8.839E-02, A_{14} = 1.417E-01,$
$A_{16} = -7.161E-02$
Sixth Surface $k = -9.465E-01, A_4 = 1.900E-01, A_6 = -1.293E-01, A_8 = 7.829E-02,$
$A_{10} = -2.294E-02, A_{12} = -2.556E-03, A_{14} = 2.150E-03,$
$A_{16} = -1.884E-04$
Seventh Surface $k = 0.000, A_4 = -3.380E-02, A_6 = 1.083E-01, A_8 = -5.666E-02,$
$A_{10} = 1.590E-02, A_{12} = -2.634E-03, A_{14} = 2.084E-04,$
$A_{16} = -1.242E-04$
Eighth Surface $k = -1.772E+01, A_4 = -8.936E-02, A_6 = 3.713E-02, A_8 = -1.414E-02,$
$A_{10} = 3.460E-03, A_{12} = -5.721E-04, A_{14} = 5.709E-05,$
$A_{16} = -2.842E-06$ Values of the respective conditional expressions are shown below:

$f4/f = -0.29$ $R8/R7 = -1.40$ $f3/f = 0.31$ $R6/R5 = 0.34$ $f34/f = -1.84$ $f2/f = -0.44$ $R4/R3 = -5.14$ $f1/f = 0.35$ $R1/R2 = -1.31$

Accordingly, the imaging lens of Numerical Data Example 4 satisfies the respective conditional expressions (1) to (9). In addition, a distance on the optical axis X from the surface of the first lens L1 on the object side to the image plane IM is 5.96 mm in air, and therefore the size of the imaging lens is suitably reduced.

Figure 11:
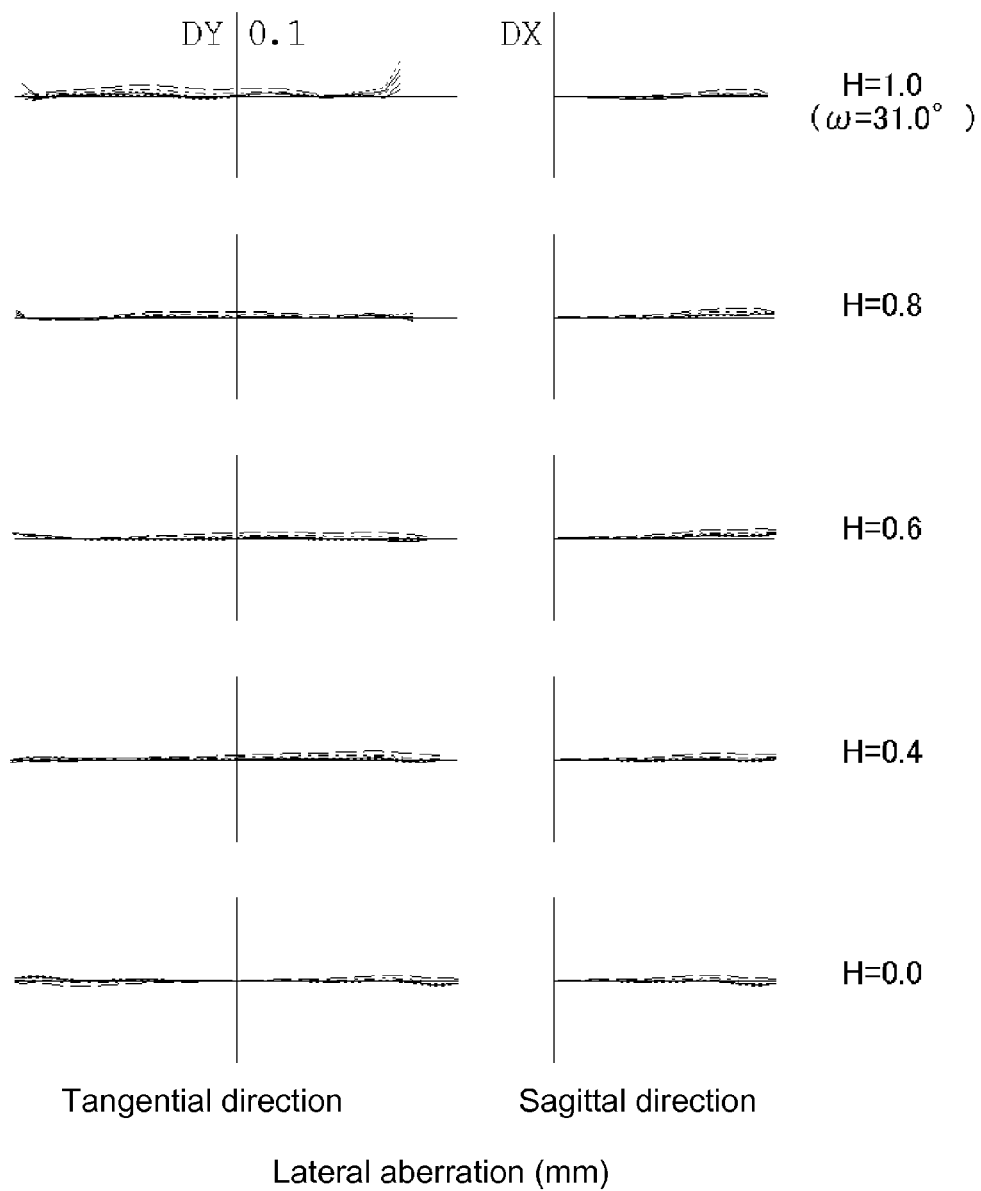
FIG. 11 is an aberration diagram showing a lateral aberration of the imaging lens of FIG. 10.
Figure 12:
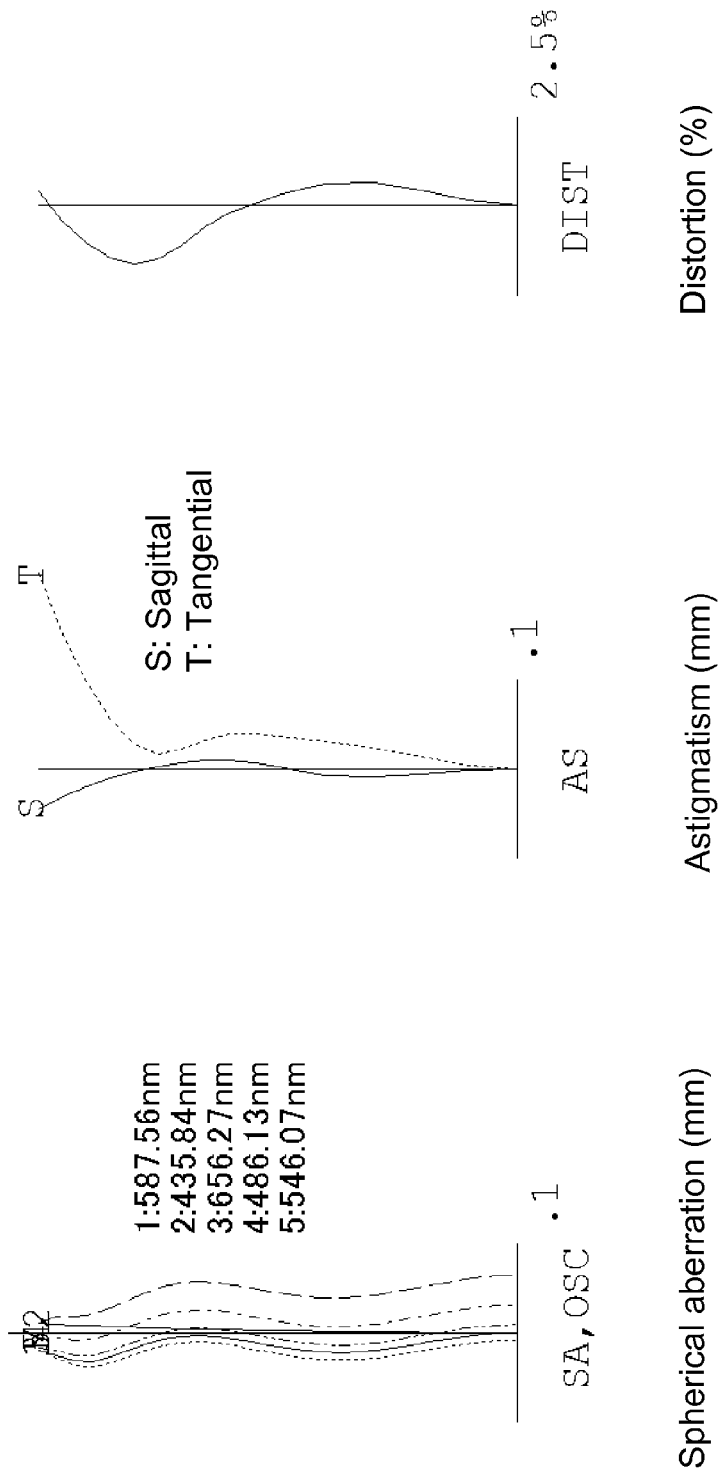
FIG. 12 is an aberration diagram showing a spherical aberration, an astigmatism, and a distortion of the imaging lens of FIG. 10.
Figure 13:
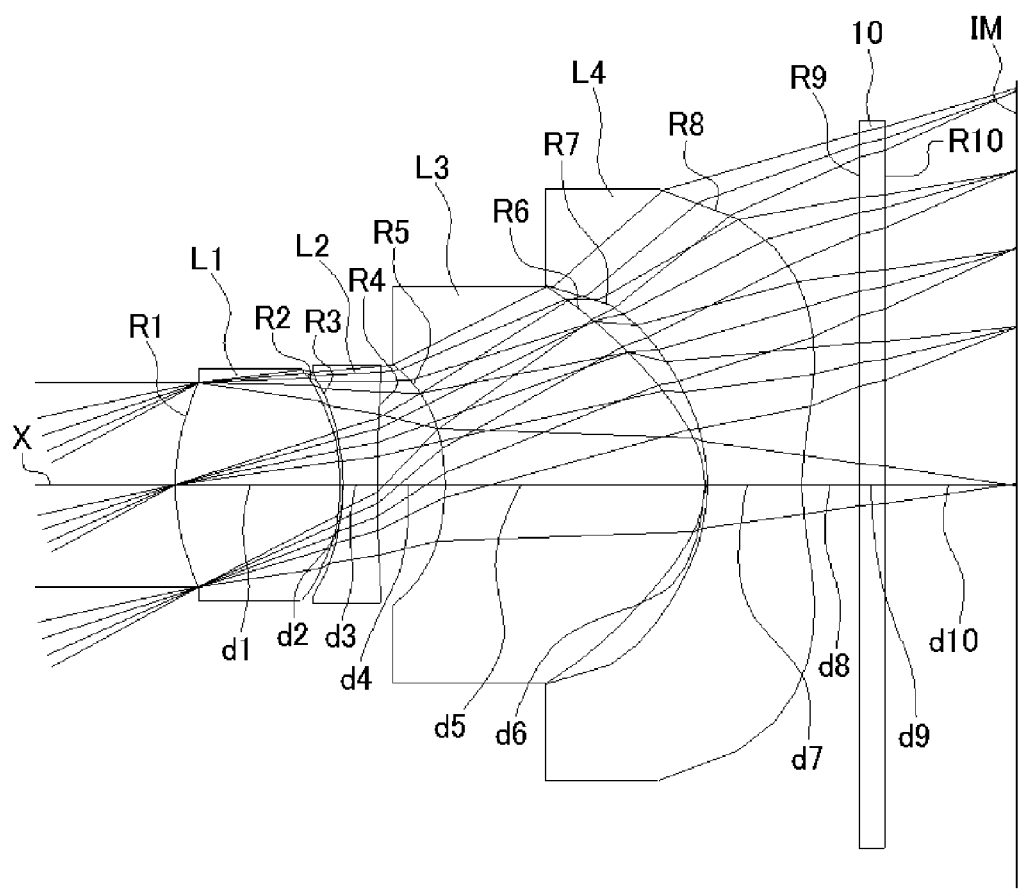
FIG. 13 is a schematic sectional view showing a configuration of an imaging lens in Numerical Data Example 5 according to the embodiment.

FIG. 11 shows a lateral aberration that corresponds to the image height ratio H, and FIG. 12 shows a spherical aberration SA (mm), an astigmatism AS (mm), and a distortion DIST (%) of the imaging lens of Numerical Data Example 4, respectively. As shown in FIGS. 11 and 12, in the imaging lens of Numerical Data Example 4, the image plane is satisfactorily corrected and each aberration is also suitably corrected, similarly to Numerical Data Example 1.

Numerical Data Example 5

Basic lens data are shown below.
f = 5.50 mm, Fno = 3.45, ω = 29.2°
Unit: mm

Surface Data

| Surface Number i | R | d | Nd | vd |
|---|---|---|---|---|
| (Object) | ∞ | ∞ | | |
| 1* (Stop) | 1.79 | 1.29 | 1.53 | 56.0 |
| 2* | −1.45 | 0.02 | | |
| 3* | −1.71 | 0.27 | 1.61 | 26.0 |
| 4* | 9.60 | 0.53 | | |
| 5* | −1.68 | 2.03 | 1.54 | 55.9 |
| 6* | −0.73 | 0.02 | | |
| 7* | −1.58 | 0.74 | 1.53 | 56.0 |
| 8* | 1.79 | 0.45 | | |
| 9 | ∞ | 0.20 | 1.52 | 64.1 |
| 10 | ∞ | 1.02 | | |
| (Image Plane) | ∞ | | | | f1 = 1.74 mm
f2 = −2.34 mm
f3 = 1.34 mm
f4 = −1.46 mm
f34 = −8.89 mm

Aspheric Surface Data

First Surface $k = 0.000, A_4 = 1.773E-03, A_6 = -4.197E-02, A_8 = 5.065E-02,$
$A_{10} = -9.264E-03, A_{12} = -5.334E-02$
Second Surface $k = -1.078, A_4 = 6.203E-02, A_6 = -1.208E-01, A_8 = 5.993E-03$
Third Surface $k = -6.381E-01, A_4 = 4.120E-02, A_6 = -2.821E-02, A_8 = -2.004E-02,$
$A_{10} = -3.994E-02, A_{12} = -4.657E-02, A_{14} = 8.335E-02,$
$A_{16} = -1.145E-02$
Fourth Surface $k = 0.000, A_4 = -3.167E-02, A_6 = 5.134E-02, A_8 = 2.527E-02,$
$A_{10} = -1.090E-01, A_{12} = 4.671E-02, A_{14} = 6.397E-03,$
$A_{16} = -1.709E-02$
Fifth Surface $k = -6.826E-02, A_4 = -1.119E-01, A_6 = -7.754E-02, A_8 = 1.833E-01, A_{10} = -1.449E-01, A_{12} = -1.102E-01, A_{14} = 1.348E-01,$
$A_{16} = -6.205E-02$
Sixth Surface $k = -9.863E-01, A_4 = 2.091E-01, A_6 = -1.334E-01, A_8 = 7.800E-02,$
$A_{10} = -2.238E-02, A_{12} = -2.364E-03, A_{14} = 2.150E-03,$
$A_{16} = -2.300E-04$ -continued Basic lens data are shown below.
f = 5.50 mm, Fno = 3.45, ω = 29.2°
Unit: mm Seventh Surface k = 0.000, $A_4$ = −5.534E−02, $A_6$ = 1.130E−01, $A_8$ = −5.702E−02,
$A_{10}$ = 1.551E−02, $A_{12}$ = −2.385E−03, $A_{14}$ = 3.190E−04,
$A_{16}$ = −1.861E−04

Eighth Surface k = −1.422E+01, $A_4$ = −1.016E−01, $A_6$ = 3.862E−02, $A_8$ = −1.394E−02,
$A_{10}$ = 3.449E−03, $A_{12}$ = −5.789E−04, $A_{14}$ = 5.657E−05,
$A_{16}$ = −2.784E−06

Values of the respective conditional expressions are shown below:

$f4/f$=−0.27

$R8/R7$=−1.13

$f3/f$=0.24

$R6/R5$=0.43

$f34/f$=−1.62

$f2/f$=−0.43

$R4/R3$=−5.61

$f1/f$=0.32

$R1/R2$=−1.23

Accordingly, the imaging lens of Numerical Data Example 5 satisfies the respective conditional expressions (1) to (9). In addition, a distance on the optical axis X from the surface of the first lens L1 on the object side to the image plane IM is 6.50 mm in air, and therefore the size of the imaging lens is suitably reduced.

Figure 14:
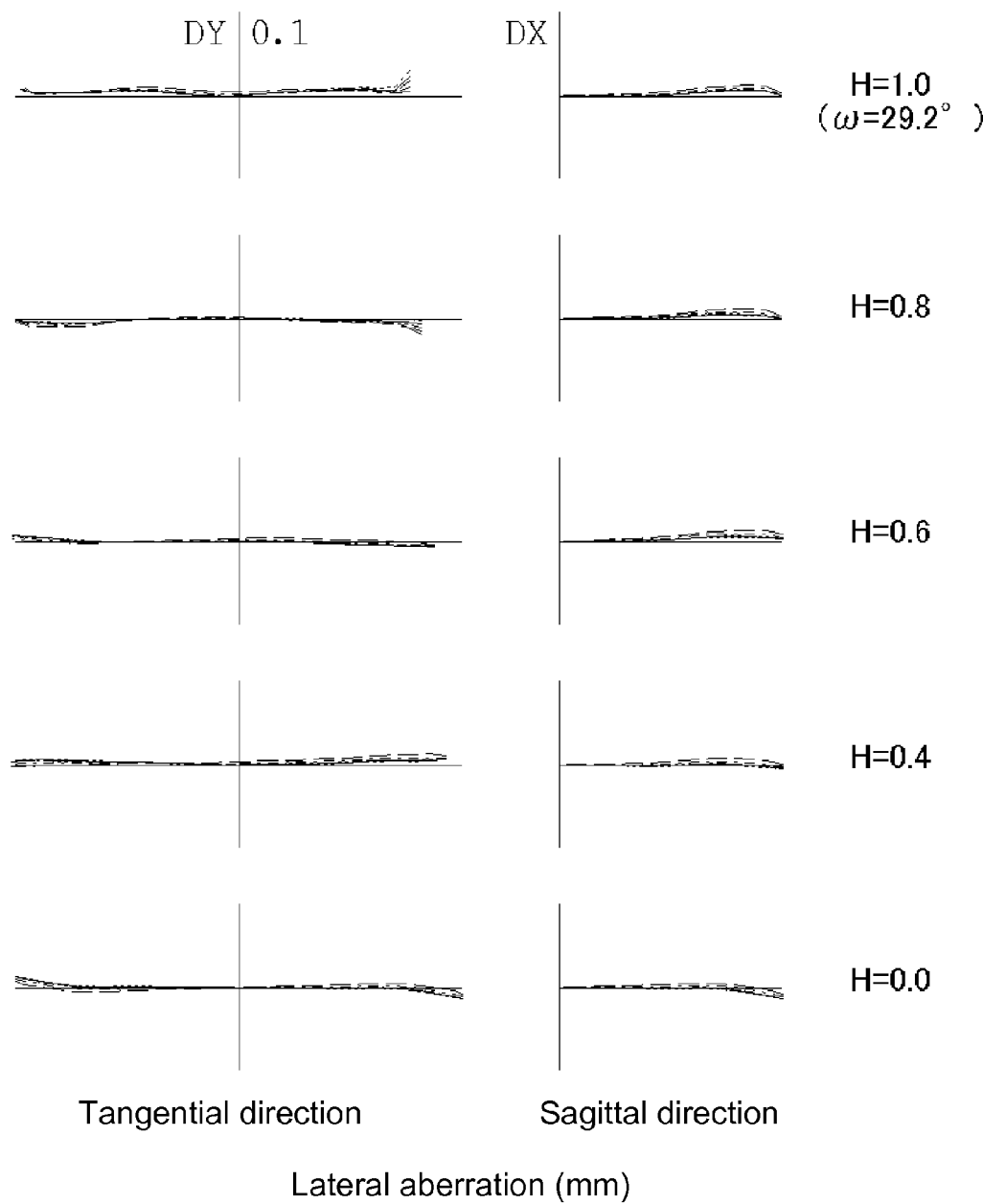
FIG. 14 is an aberration diagram showing a lateral aberration of the imaging lens of FIG. 13.
Figure 15:
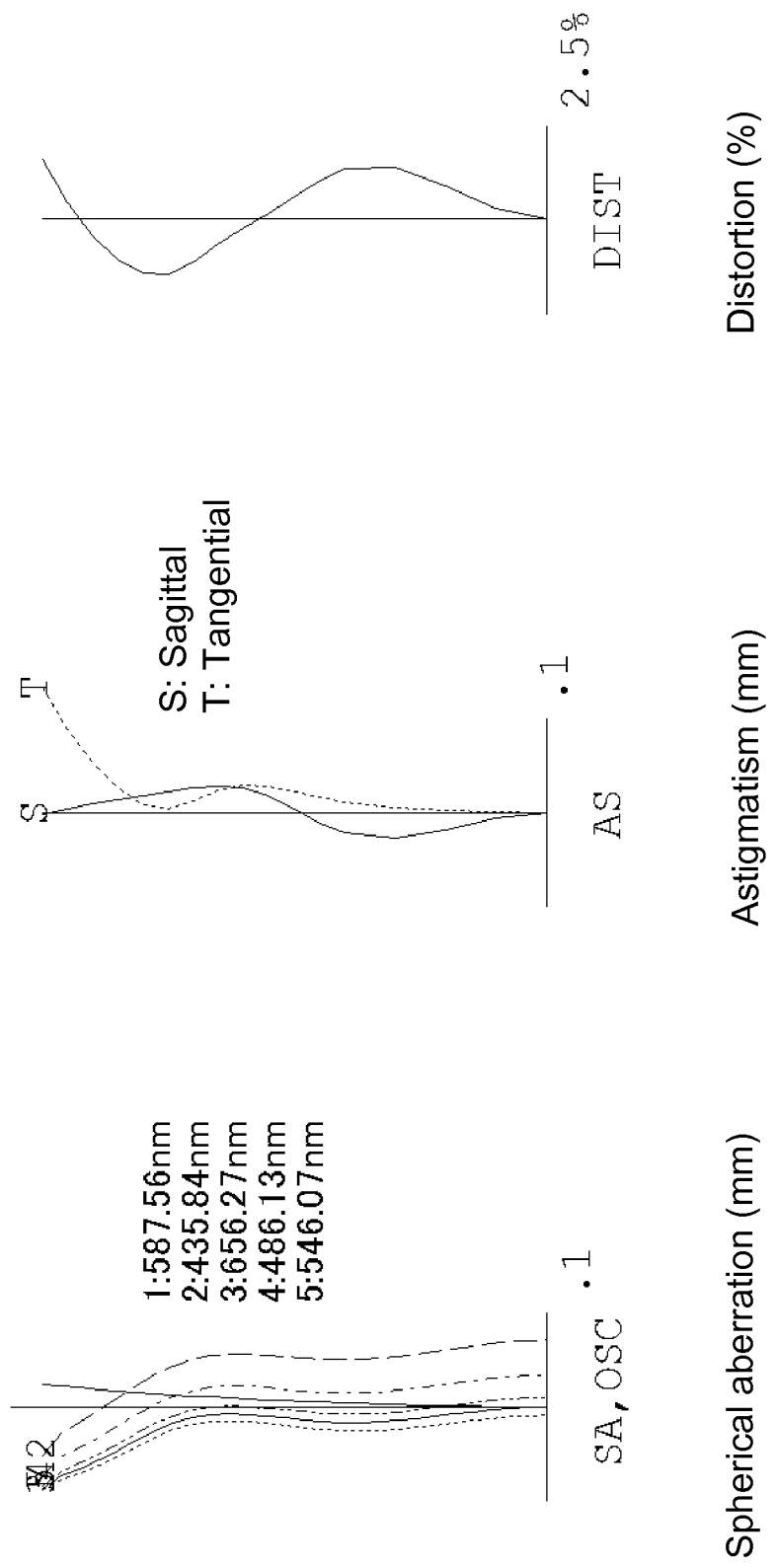
FIG. 15 is an aberration diagram showing a spherical aberration, an astigmatism, and a distortion of the imaging lens of FIG. 13.

FIG. 14 shows a lateral aberration that corresponds to the image height ratio H, and FIG. 15 shows a spherical aberration SA (mm), an astigmatism AS (mm), and a distortion DIST (%) of the imaging lens of Numerical Data Example 5, respectively. As shown in FIGS. 14 and 15, in the imaging lens of Numerical Data Example 5, the image plane is satisfactorily corrected and each aberration is also suitably corrected, similarly to Numerical Data Example 1.

Accordingly, when the imaging lens of the embodiment is applied to an imaging optical system of a cellular phone, a digital still camera, a portable information terminal, a security camera, a vehicle onboard camera, a network camera, and the like, it is possible to attain both higher functions and miniaturization of such camera.

The invention may be applicable to an imaging lens for mounting on a device that requires the imaging lens to have both a small size and satisfactory aberration correction performance, for example, a cellular phone or a digital still camera.

What is claimed is:

1. An imaging lens comprising:
a first lens having positive refractive power;
a second lens having negative refractive power;
a third lens having positive refractive power; and
a fourth lens having negative refractive power arranged in this order from an object side to an image plane side,
wherein said first lens is formed in a shape so that a surface thereof on the object side is convex toward an object,
said second lens is formed in a shape so that a surface thereof on the object side is concave toward the object and a surface thereof on the image plane side is convex toward the object,
said third lens is formed in a shape so that both a surface thereof on the object side and a surface thereof on the image plane side are concave toward the object,
said fourth lens is formed in a shape so that a surface thereof on the object side is concave toward the object and a surface thereof on the image plane side is convex toward the object,
said fourth lens has a focal length f4 and a whole lens system has a focal length f so that the imaging lens satisfies the following expression:

−0.33≤$f4/f$<−0.1 said third lens has a focal length f3 so that the imaging lens satisfies the following expression:

0.15<$f3/f$≤0.43 said second lens has the surface on the object side having a curvature radius R3 and the surface on the image plane side having a curvature radius R4 so that the imaging lens satisfies the following expression:

−8.0<$R4/R3$<−2.0.

2. The imaging lens according to claim 1, wherein said fourth lens has the surface on the object side having a curvature radius R7 and the surface on the image plane side having a curvature radius R8 so that the imaging lens satisfies the following expression:

−1.5<$R8/R7$<−0.2.

3. The imaging lens according to claim 1, wherein said third lens and said fourth lens have a composite focal length f34 so that the imaging lens satisfies the following expression:

−2.0<$f34/f$<−0.5.

4. The imaging lens according to claim 1, wherein said second lens has a focal length f2 so that the imaging lens satisfies the following expression:

−0.9<$f2/f$<−0.1.

5. The imaging lens according to claim 1, wherein said first lens has a focal length f1 so that the imaging lens satisfies the following expression:

0.2<$f1/f$<0.6.

6. The imaging lens according to claim 1, wherein said first lens is formed in the shape so that the surface thereof on the object side is convex toward the object, a surface thereof on the image plane side is concave toward the object, said first lens having the surface on the object side having a curvature radius R1 and the surface on the image plane side having a curvature radius R2 so that the imaging lens satisfies the following expression:

−2.0<$R1/R2$<−1.0.

7. An imaging lens comprising:
a first lens having positive refractive power;
a second lens having negative refractive power;
a third lens having positive refractive power; and
a fourth lens having negative refractive power arranged in this order from an object side to an image plane side,
wherein said first lens is formed in a shape so that a surface thereof on the object side is convex toward an object, said second lens is formed in a shape so that a surface thereof on the object side is concave toward the object and a surface thereof on the image plane side is convex toward the object, said third lens is formed in a shape so that both a surface thereof on the object side and a surface thereof on the image plane side are concave toward the object, said fourth lens is formed in a shape so that a surface thereof on the object side is concave toward the object and a surface thereof on the image plane side is convex toward the object, said fourth lens has a focal length f4 and a whole lens system has a focal length f so that the imaging lens satisfies the following expression:

$-0.33 \leq f4/f < -0.1$ said third lens and said fourth lens have a composite focal length f34 so that the imaging lens satisfies the following expression:

$-2.0 < f34/f \leq -1.07$.

8. The imaging lens according to claim 7, wherein said fourth lens has the surface on the object side having a curvature radius R7 and the surface on the image plane side having a curvature radius R8 so that the imaging lens satisfies the following expression:

$-1.5 < R8/R7 < -0.2$.

9. The imaging lens according to claim 7, wherein said third lens has a focal length f3 so that the imaging lens satisfies the following expression:

$0.15 < f3/f < 0.6$.

10. The imaging lens according to claim 7, wherein said second lens has a focal length f2 so that the imaging lens satisfies the following expression:

$-0.9 < f2/f < -0.1$.

11. The imaging lens according to claim 7, wherein said second lens has the surface on the object side having a curvature radius R3 and the surface on the image plane side having a curvature radius R4 so that the imaging lens satisfies the following expression:

$-8.0 < R4/R3 < -2.0$.

12. The imaging lens according to claim 7, wherein said first lens has a focal length f1 so that the imaging lens satisfies the following expression:

$0.2 < f1/f < 0.6$.

13. The imaging lens according to claim 7, wherein said first lens is formed in the shape so that the surface thereof on the object side is convex toward the object, a surface thereof on the image plane side is concave toward the object, said first lens having the surface on the object side having a curvature radius R1 and the surface on the image plane side having a curvature radius R2 so that the imaging lens satisfies the following expression:

$-2.0 < R1/R2 < -1.0$.

* * * * *